US010732497B2

(12) United States Patent
Yamaguchi et al.

(10) Patent No.: US 10,732,497 B2
(45) Date of Patent: Aug. 4, 2020

(54) TRANSPARENT SCREEN AND IMAGE DISPLAY SYSTEM (71) Applicant: Panasonic Intellectual Property Management Co., Ltd., Osaka (JP)

(72) Inventors: Hiroshi Yamaguchi, Osaka (JP); Daizaburo Matsuki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/307,276

(22) PCT Filed: Apr. 13, 2017

(86) PCT No.: PCT/JP2017/015051
§ 371 (c)(1),
(2) Date: Dec. 5, 2018

(87) PCT Pub. No.: WO2017/221528
PCT Pub. Date: Dec. 28, 2017

(65) Prior Publication Data
US 2019/0346758 A1 Nov. 14, 2019

(30) Foreign Application Priority Data

Jun. 20, 2016 (JP) ................................. 2016-121377

(51) Int. Cl.
*G03B 21/62* (2014.01)
*G03B 21/60* (2014.01)
(Continued)

(52) U.S. Cl.
CPC ........... *G03B 21/62* (2013.01); *G02B 5/0278* (2013.01); *G03B 21/60* (2013.01); *G03B 21/602* (2013.01); *G03B 21/625* (2013.01)

(58) Field of Classification Search
CPC ...... G03B 21/60; G03B 21/602; G03B 21/62; G03B 21/625; G03B 21/0278
(Continued)

(56) References Cited

U.S. PATENT DOCUMENTS 3,655,262 A * 4/1972 DePalma ............... G03B 21/62
359/453
5,040,870 A * 8/1991 Ohno ....................... G02B 1/04
359/443
(Continued)

FOREIGN PATENT DOCUMENTS

JP 57-153334 U 9/1982
JP 2001-005103 1/2001
(Continued)

OTHER PUBLICATIONS

J.A. Wheatley and W.J. Schrenk., Polymeric Reflective Materials (PRM), Journal of Plastic Film & Sheeting, vol. 10—Jan. 1994, pp. 78-89 (Year: 1994).*
(Continued)

*Primary Examiner* — Clayton E. LaBalle
*Assistant Examiner* — Kevin C Butler
(74) *Attorney, Agent, or Firm* — Wenderoth, Lind & Ponack, L.L.P.

(57) ABSTRACT

A transparent screen is a transparent screen for diffusing image light projected from a projector and displaying an image by transmitting part of incident light rectilinearly and diffusing the other part of the incident light. The transparent screen includes a first base material that is transparent, a diffusion member, a second base material that is transparent, and a plurality of light absorption materials. The diffusion member is disposed within a first base material and diffuses the image light. The second base material is disposed on an opposite side of the first base material from the projector.

(Continued)

The plurality of light absorption materials is disposed within the second base material and is arranged parallel to each other along an arrangement direction parallel to a principal plane of the second base material.

9 Claims, 4 Drawing Sheets

(51) Int. Cl.
*G03B 21/602* (2014.01)
*G02B 5/02* (2006.01)
*G03B 21/625* (2014.01)

(58) Field of Classification Search
USPC ........................................................ 359/452
See application file for complete search history.

(56) References Cited

U.S. PATENT DOCUMENTS

| | | | | |
|---|---|---|---|---|
| 5,962,114 | A * | 10/1999 | Jonza | B29C 55/023 |
| | | | | 428/212 |
| 6,018,419 | A * | 1/2000 | Cobb, Jr. | G02B 5/0841 |
| | | | | 359/485.02 |
| 6,185,038 | B1 | 2/2001 | Yamaguchi et al. | |
| 6,381,068 | B1 * | 4/2002 | Harada | G02B 5/0215 |
| | | | | 359/443 |
| 6,926,952 | B1 * | 8/2005 | Weber | G02B 1/111 |
| | | | | 428/212 |
| 2001/0005282 | A1 * | 6/2001 | Etori | G03B 21/62 |
| | | | | 359/453 |
| 2003/0184830 | A1 * | 10/2003 | Takada | G02B 5/0252 |
| | | | | 359/15 |
| 2008/0030882 | A1 * | 2/2008 | Ichikawa | G03B 21/60 |
| | | | | 359/839 |
| 2008/0297726 | A1 * | 12/2008 | Rodriguez, Jr. | G03B 21/14 |
| | | | | 353/13 |
| 2009/0207488 | A1 * | 8/2009 | Akiyama | G03B 21/60 |
| | | | | 359/455 |
| 2010/0103515 | A1 * | 4/2010 | Kang | G03B 21/60 |
| | | | | 359/452 |
| 2010/0128234 | A1 * | 5/2010 | Nishikawa | H04N 9/3105 |
| | | | | 353/98 |
| 2015/0362728 | A1 * | 12/2015 | Tei | G02B 5/3033 |
| | | | | 353/20 |
| 2017/0059982 | A1 * | 3/2017 | Watanabe | G02B 5/02 |
| 2017/0205701 | A1 * | 7/2017 | Ide | G03B 21/62 |
| 2017/0269360 | A1 * | 9/2017 | Yamaguchi | G02B 5/0221 |
| 2018/0180982 | A1 * | 6/2018 | Yamaki | G02B 5/02 |
| 2019/0049835 | A1 * | 2/2019 | Fujimura | G03B 21/60 |
| 2019/0094432 | A1 * | 3/2019 | Yanai | G02B 5/30 |

FOREIGN PATENT DOCUMENTS

| | | | | |
|---|---|---|---|---|
| JP | 2001005103 | * | 1/2001 | ............ G03B 21/62 |
| JP | 2005-107011 | | 4/2005 | |
| JP | 2005107011 | * | 4/2005 | ............ G02B 5/02 |
| JP | 2006-119489 | | 5/2006 | |
| JP | 4025432 B | | 12/2007 | |
| JP | 2010-529493 | | 8/2010 | |
| JP | 2010529493 | * | 8/2010 | ............ G02B 13/04 |
| JP | 5214577 B | | 6/2013 | |
| JP | 2014-071250 | | 4/2014 | |
| JP | 2015-212800 | | 11/2015 | |
| JP | 2015212800 | * | 11/2015 | ............ G02B 5/02 |
| WO | 2008/150866 | | 12/2008 | |
| WO | WO-2016203915 A1 | * | 12/2016 | ............ G02B 5/02 |

OTHER PUBLICATIONS

International Search Report of PCT application No. PCT/JP2017/015051 dated Jul. 11, 2017.

* cited by examiner

TRANSPARENT SCREEN AND IMAGE DISPLAY SYSTEM

CROSS-REFERENCE TO RELATED APPLICATIONS

This application is a U.S. national stage application of the PCT International Application No. PCT/JP2017/015051 filed on Apr. 13, 2017, which claims the benefit of foreign priority of Japanese patent application No. 2016-121377 filed on Jun. 20, 2016, the contents all of which are incorporated herein by reference.

TECHNICAL FIELD

The present disclosure relates to a transparent screen for diffusing image light projected from a projector and displaying an image by transmitting part of incident light rectilinearly and diffusing the other part of the incident light, and an image display system including the transparent screen.

BACKGROUND ART

In recent years, a transparent screen has been proposed that has transparency to transmit background light and causes image light projected from a projector to undergo diffused reflection or diffused transmission to display an image. When this transparent screen is used, for example, it is possible to display a projected image superimposed on a night view in a window of a skyscraper, and to display a projected image superimposed on products in an exhibition window of a store. In this way, the transparent screen is expected as a key device for implementing new image representation by a projector.

As a transparent screen of a transmission type, a transparent screen of a transmission type including special diffusion microparticles has been proposed (for example, refer to PTL 1). These diffusion microparticles are distributed in a very small amount within the transparent screen of a transmission type. This transparent screen of a transmission type diffuses part of image light greatly and displays an image, and transmits background light rectilinearly.

Part of the diffused light is reflected by an interface between a back surface of the transparent screen and the air. Therefore, the transparent screen of a transmission type having the above-described configuration can be used as a transparent screen of a reflection type.

Furthermore, as the transparent screen of a reflection type, the following transparent screen of a reflection type has been proposed. One example of the transparent screen of a reflection type includes a plurality of protrusions, a selective reflection layer provided in the plurality of protrusions, and a transparent material covering a front surface of the selective reflection layer. The selective reflection layer selectively reflects right-handed circularly polarized or left-handed circularly polarized laser light having a wavelength of a characteristic (refer to PTL 2). Another example of the transparent screen of a reflection type has a light-reflecting region partially provided in a transparent base material (refer to PTL 3).

An observer can enjoy an image while observing background by using such a transparent screen of a transmission type or reflection type.

CITATION LIST

Patent Literature

PTL 1: Japanese Patent No. 5214577
PTL 2: Unexamined Japanese Patent Publication No. 2014-71250
PTL 3: Unexamined Japanese Patent Publication No. 2006-119489

SUMMARY OF THE INVENTION

The present disclosure provides a transparent screen that can inhibit generation of unnecessary images, and an image display system.

The transparent screen according to the present disclosure is a transparent screen for diffusing image light projected from a projector and displaying an image by transmitting part of incident light rectilinearly and diffusing the other part of the incident light, and includes a first base material that is transparent, a diffusion member, a second base material that is transparent, and a plurality of light absorption materials. The diffusion member is disposed within the first base material and diffuses the image light. The second base material is disposed on an opposite side of the first base material from the projector. The plurality of light absorption materials is disposed within the second base material and is arranged parallel to each other along an arrangement direction parallel to a principal plane of the second base material.

According to the present disclosure, generation of unnecessary images can be inhibited. This allows an observer to observe an image without being aware that the image displayed on the transparent screen is a projected image.

DESCRIPTION OF EMBODIMENT (Circumstances that have LED to the Present Disclosure)

Conventionally, in order for a transparent screen to transmit background light, at least part of incident light into the transparent screen needs to be transmitted through the transparent screen rectilinearly. Priority is usually given to transparency for applications of the transparent screen in many cases. When priority is given to transparency, the transparent screen transmits 50% to 80% of incident light rectilinearly. If there is unevenness on a surface of the transparent screen, which is an interface between the transparent screen and the air, light will be diffused and will not be transmitted through the transparent screen rectilinearly. Therefore, in order for light to be transmitted through the transparent screen rectilinearly, the surface of the transparent screen needs to be smooth.

Therefore, even when an element of diffused transmission or diffused reflection is on the surface of the transparent screen, 50% or more of the surface of the transparent screen needs to be smooth. Meanwhile, when the element of diffusion is within the transparent screen, the entire surface of the transparent screen is generally smooth.

Then, the incident light into the smooth surface is specularly reflected on the surface. Since image light projected from a projector has locally high directivity, the specularly reflected light of the image light has high luminance. Therefore, if an observer who observes an image directly observes the specularly reflected light, the observer is dazzled and cannot observe the image. Therefore, in order to prevent the specularly reflected light from going to an assumed observation range, it is preferable to project image light at a wide angle downward from a ceiling or upward from a footing.

However, when the image light is projected downward from the ceiling, an unnecessary image by the image light that is transmitted through the transparent screen is generated in the footing near the transparent screen. Meanwhile, when the image light is projected upward from the footing, an unnecessary image by the image light that is transmitted through the transparent screen is generated on the ceiling near the transparent screen. The unnecessary image generated in the ceiling or footing is offensive to the observer. Furthermore, by recognizing the unnecessary image, the observer will be aware that an image displayed on the transparent screen is an image projected from the projector.

The present disclosure provides a screen that can inhibit generation of unnecessary images, and an image display system. This allows an observer to observe an image without being aware that the image displayed on the screen is a projected image.

An exemplary embodiment will be described below with reference to the drawings. However, an unnecessarily detailed description will be omitted in some cases. For example, a detailed description of a well-known matter and a duplicated description of substantially identical configuration will be omitted in some cases. This is to avoid unnecessary redundancy in the following description and to facilitate understanding by those skilled in the art.

Note that the accompanying drawings and the following description are provided to enable those skilled in the art to fully understand the present disclosure, and are not intended to limit the subject of the present disclosure.

First Exemplary Embodiment

Figure 1:
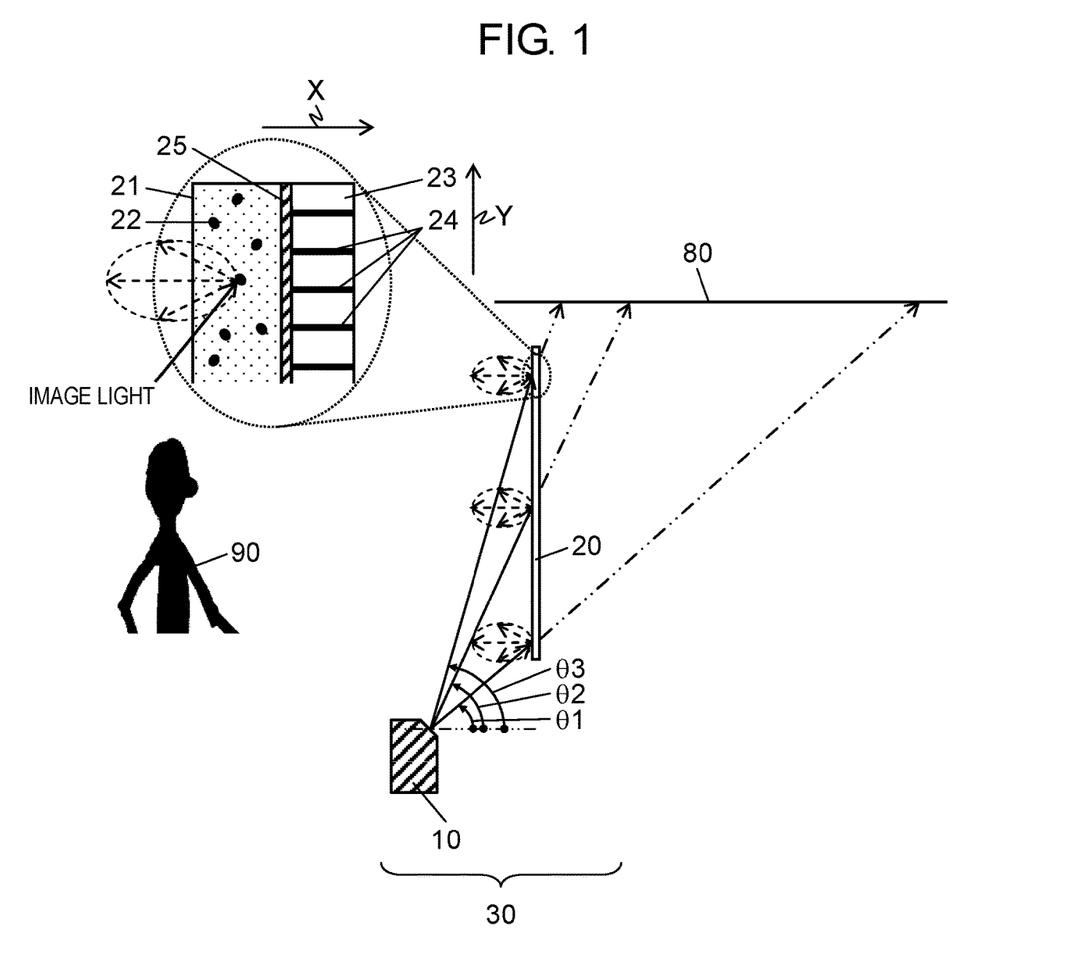
FIG. 1 is a schematic diagram of an image display system according to a first exemplary embodiment.

FIG. 1 is a schematic diagram of image display system 30 according to a first exemplary embodiment.

Image display system 30 includes projector 10 projecting image light and screen 20.

Projector 10 is a super short focal length projector and is disposed on a front footing of screen 20. If observer 90 who observes images directly observes specularly reflected light on a surface of screen 20, observer 90 feels dazzling. That is, the specularly reflected light obstructs image observation and background observation. Therefore, projector 10 projects image light on screen 20 at a large angle. Furthermore, free space near screen 20 can be effectively used by using the super short focal length projector. In the present disclosure, the background is a landscape on an opposite side of screen 20 from observer 90. That is, observer 90 observes the background through screen 20. The background light is light reaching observer 90 from a background side through screen 20.

An incidence angle of the image light projected on screen 20 from projector 10 is set as follows. Here, the incidence angle of the image light is an angle between an incident direction of the image light and a normal direction to screen 20. An incidence angle $\theta 1$ to a lower end of screen 20 is set at 27 degrees, an incidence angle $\theta 2$ to a center of screen 20 is set at 52 degrees, and an incidence angle $\theta 3$ to an upper end of screen 20 is set at 64 degrees.

Screen 20 is a screen for causing the image light projected from projector 10 to undergo diffused reflection and displaying an image by transmitting part of incident light rectilinearly and diffusing the other part of the incident light. That is, screen 20 is a transparent screen of a reflection type. Screen 20 includes base material 21 (first base material) that is transparent, diffusion microp articles 22 (one example of diffusion member), base material 23 (second base material) that is transparent, and a plurality of light absorption materials 24. Both principal planes of base material 21 are smooth. Diffusion microparticles 22 are added within base material 21. Diffusion microparticles 22 perform diffused reflection of about 10% of the incident light. Screen 20 transmits remaining about 90% of the incident light. Diffusion microp articles 22 are uniformly distributed within base material 21. Therefore, the image light undergoes diffused reflection by screen 20, and can be observed as an image.

Both principal planes of screen 20 are also smooth. Therefore, light transmitted through screen 20 travels rectilinearly, without being diffused in a thickness direction of screen 20. Therefore, observer 90 can observe the background clearly.

Screen 20 includes base material 23 that is transparent disposed on a background side of base material 21. That is, base material 23 is disposed on an opposite side of base material 21 from projector 10. Within base material 23, the plurality of light absorption materials 24 is arranged in a louver shape along an arrangement direction Y parallel to a principal plane of base material 23. That is, the plurality of light absorption materials 24 is disposed within base material 23 and is arranged parallel to each other along the arrangement direction Y parallel to the principal plane of base material 23. The arrangement direction Y may be, for example, a vertical direction. Base material 21 and base material 23 are mechanically joined by transparent adhesive layer 25 including a transparent material. Base material 21 and base material 23 include transparent materials having refractive indices almost identical to each other. Base material 21 and base material 23, which are joined by transparent adhesive layer 25 without an air interface interposed therebetween, are also optically combined.

The plurality of light absorption materials 24 extends along a normal direction X to the principal plane of base material 21 and base material 23. Therefore, light absorption materials 24 efficiently transmit background light entering from the normal direction X, and effectively absorb light entering from an oblique direction. Note that in the present exemplary embodiment, a longitudinal direction of light absorption materials 24 is a direction orthogonal to the normal direction X and the arrangement direction Y. That is, the longitudinal direction of light absorption materials 24 may be, for example, a horizontal direction. A shape of light absorption materials 24 viewed from the arrangement direction Y is, for example, rectangular. Each of the plurality of light absorption materials 24 may extend from one principal plane of base material 23 to another principal plane of base material 23.

Such base material 23 and light absorption materials 24 having a louver structure are obtained as follows. Base material 23 including a transparent material and light absorption materials 24 having a small thickness and including a material obtained by adding a black pigment to a transparent material are laminated alternately to form an ingot, and then the ingot is sliced. With this operation, base material 23 and light absorption materials 24 having a louver structure can be obtained.

Figure 2A:
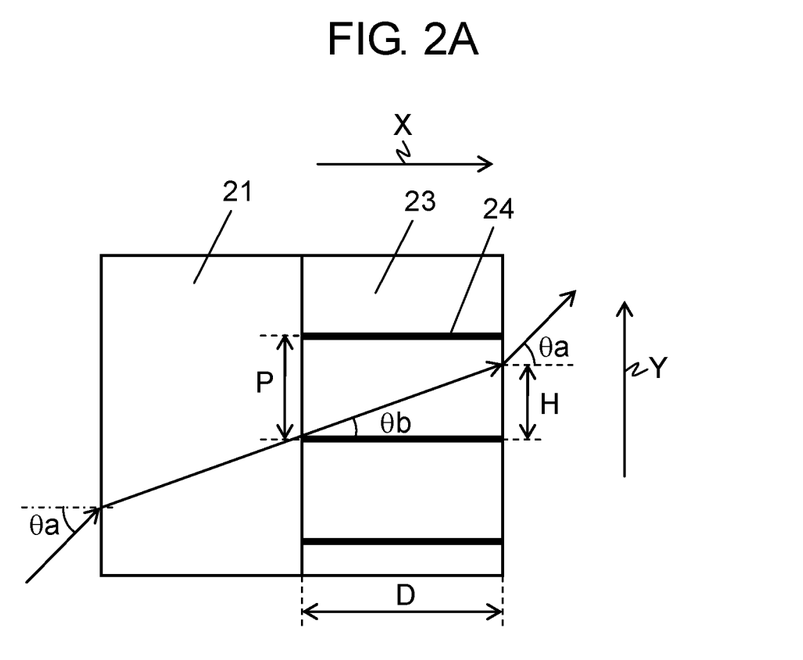
FIG. 2A is a schematic cross-sectional view of a base material and light absorption materials.

FIG. 2A is a schematic cross-sectional view of base material 23 and light absorption materials 24. In FIG. 2A, diffusion microparticles 22 and transparent adhesive layer 25 are omitted. In FIG. 2A, a length D indicates a length of light absorption materials 24 in the normal direction X. An arrangement interval P indicates an arrangement interval of the plurality of light absorption materials 24. An incidence angle θa indicates an incidence angle of a light beam. A light beam angle θb is an angle formed by a traveling direction of the light beam within base material 23 and the normal direction X. That is, the light beam angle θb indicates a traveling angle of the light beam within base material 23. A displacement H indicates a displacement in the arrangement direction Y when the light beam is transmitted through base material 23. As described above, in FIG. 2A, the light beam is refracted at the principal plane of base material 21.

Here, to make descriptions easier to understand, an ideal state is assumed in which a thickness of light absorption materials 24 is zero, a light absorption rate of light absorption materials 24 is 100%, and the light beam is not reflected by the air interface. Based on this assumption, transmittance T of the light entering screen 20 at the incidence angle θa is calculated.

First, the light entering from the normal direction X is transmitted, without being absorbed by light absorption materials 24. That is, when the incidence angle is 0 degrees, the transmittance T of light is 100%.

The light entering screen 20 at the incidence angle θa travels inside base material 23 at the light beam angle θb. At this time, part of the light is absorbed by light absorption materials 24, whereas remaining light is transmitted through base material 23. The light beam angle θb is calculated by the following formula 1.

$$\theta b = \sin^{-1}\{\sin(\theta a)/n\} \quad \text{(formula 1)}$$

Here, n is a refractive index of base material 23 that is transparent.

The transmittance T of the light traveling at the light beam angle θb in base material 23 is calculated by the following formula 2.

$$T = (P-H)/P = 1 - D/P \times \tan(\theta b) \quad \text{(formula 2)}$$

However, when the transmittance T is less than or equal to 0% in this formula 2, the transmittance T is set at 0%.

Figure 2B:
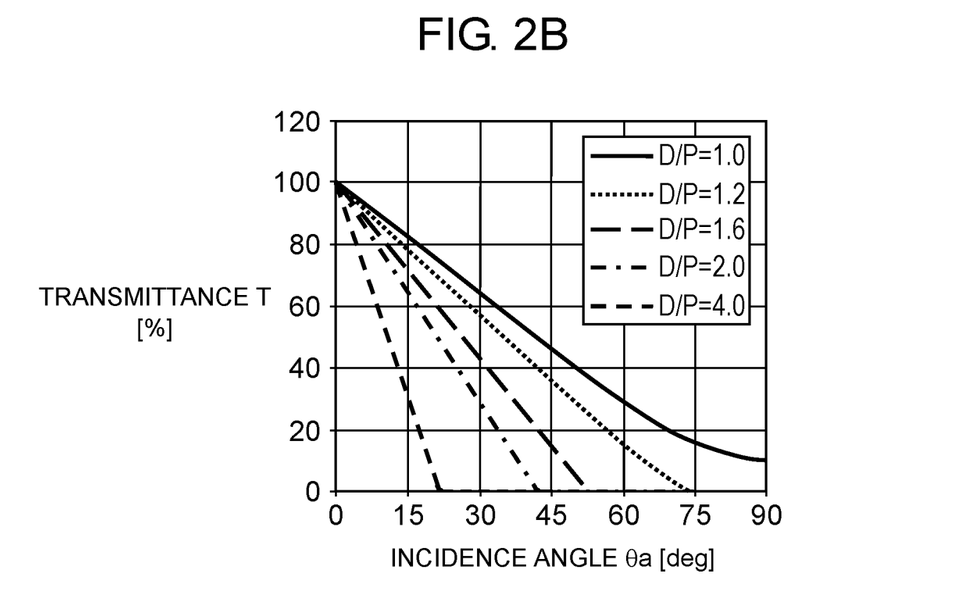
FIG. 2B is a diagram showing a relationship between an incidence angle and transmittance.

FIG. 2B is a diagram showing a relationship between the incidence angle θa and the transmittance T for each ratio DT. Here, the refractive index n of base material 23 is set at 1.5, which is typical in transparent materials. The ratio D/P is a ratio of the length D to the arrangement interval P.

As shown in FIG. 2B, the transmittance T decreases almost linearly as the incidence angle θa increases from the incidence angle of 0 degrees. At this time, inclination of the decrease differs according to each ratio DIP.

When the ratio D/P is greater than or equal to 1.2, the transmittance T will be 0% at a cut-off angle θc for each ratio DT. Furthermore, at the incidence angle θa greater than or equal to the cut-off angle θc, the transmittance T will be 0%. When the ratio D/P is 1.0, the transmittance T decreases as the incidence angle θa increases, but the cut-off angle θc does not occur. The cut-off angle θc does not occur when the ratio D/P is less than 1.12.

In this way, when the ratio D/P is increased, light absorption materials 24 absorb obliquely incident light and prevents light transmission. Accordingly, generation of unnecessary transmitted images to be described later can be reduced. However, when the ratio D/P increases, dependence of the transmittance T on the angle increases. That is, it will be difficult for obliquely downward or obliquely upward background light to be transmitted through screen 20. Therefore, it is necessary to set the appropriate ratio DT.

Next, generation of unnecessary images by image light transmitted through screen 20 that does not include light absorption materials 24 having a louver shape will be described.

As shown in FIG. 1, part of the image light projected from projector 10 (arrow of solid line) undergoes diffused reflection by screen 20, and can be observed as an image. Remaining part of the image light is transmitted through screen 20 rectilinearly. The light transmitted rectilinearly (arrow of the two-dot chain line) goes to ceiling 80, as shown in FIG. 1. The incidence angle of the rectilinearly transmitted light on a lower side of screen 20 is small. In addition, a distance of the rectilinearly transmitted light on the lower side of screen 20 to reach ceiling 80 is long. That is, since the rectilinearly transmitted light on the lower side of screen 20 spreads, sharpness and luminance of the image decrease. Therefore, observer 90 is not worried about the unnecessary image by the rectilinearly transmitted light. The distance of the rectilinearly transmitted light on a left end and right end of screen 20 to reach ceiling 80 is also long. That is, sharpness and luminance of the image decrease. Therefore, observer 90 is not worried about the unnecessary image by the rectilinearly transmitted light.

However, the rectilinearly transmitted light near an upper end of screen 20 enters ceiling 80 right above screen 20. Furthermore, since a focal depth of projector 10 is deep, the rectilinearly transmitted light toward ceiling 80 right above screen 20 is in focus. Therefore, when light absorption materials 24 having a louver shape is not used as in conventional techniques, an unnecessary image will be displayed on ceiling 80 near screen 20. Observer 90 feels this unnecessary image offensive while enjoying an image on screen 20.

In addition, as the incidence angle θ of the image light increases, a minute area dSr of the transmitted image generated on ceiling 80 corresponding to a minute area dSs of the image projected on screen 20 decreases. Here, dSr/dSs is in inverse proportion to the third power of tan (θ). Therefore, when image illuminance is uniform, the rectilinearly transmitted light is concentrated on a small area on ceiling 80 as the incidence angle θ increases. That is, on ceiling 80 corresponding to near the upper end of screen 20, light flux of the rectilinearly transmitted light is concentrated on a small area. Therefore, illuminance of the transmitted image corresponding to the upper end of screen 20 increases.

In this way, in the configuration of FIG. 1, as the incidence angle of the image light entering near the upper end of screen 20 increases, luminance as an unnecessary image increases and becomes offensive.

Considering these matters, it is desirable to set the ratio D/P between 1.2 and 2.0 inclusive, in other words, to set the cut-off angle θc between 42 degrees and 74 degrees inclusive. At this time, the length D is between 72 μm and 300 μm inclusive, and the arrangement interval P is between 60 μm and 150 μm inclusive. When viewed from the normal direction X, a ratio of an area of the plurality of light absorption materials 24 to an area of base material 23 is between 1% and 10% inclusive. For example, when the arrangement interval P is 100 μm, a length of light absorption materials 24 in the arrangement direction Y is between 1 μm and 10 μm inclusive, and a length of base material 23 in the arrangement direction Y is between 90 μm and 99 μm inclusive.

When the ratio D/P is set at less than 1.2 (for example, when the ratio D/P is set at 1.0), light absorption materials 24 cannot fully absorb the image light entering the upper end of screen 20. Therefore, an effect of reducing unnecessary images is small.

Meanwhile, when the ratio D/P is set at greater than 2.0 (for example, when the ratio D/P is set at 4.0), light of the incidence angle greater than or equal to 21 degrees is all absorbed. That is, about the light of the incidence angle greater than or equal to 21 degrees, all the rectilinearly transmitted light is absorbed, inhibiting generation of unnecessary images. However, since obliquely incident background light is also absorbed, background visibility decreases.

With the above-described configuration, image display system 30 according to the first exemplary embodiment can inhibit generation of unnecessary images by the rectilinearly transmitted light while implementing display of images and transmission of background light. This allows observer 90 to observe an image without being aware that the image displayed on screen 20 is a projected image.

Note that in the present exemplary embodiment, projector 10 is a super short focal length projector. When the super short focal length projector is used, projector 10 is often disposed such that the incidence angle in the upper end of screen 20, which is a maximum incidence angle of the image light to screen 20, is set at between 60 degrees and 75 degrees inclusive. Therefore, the ratio D/P of a louver structure is set at greater than or equal to 1.2. This allows screen 20 to significantly inhibit the transmittance of the image light having the incident angle less than or equal to the maximum incident angle.

When the super short focal length projector is used, projector 10 is often disposed such that the incidence angle of the image light in a center of screen 20 is between 40 degrees and 50 degrees inclusive. The transmitted light on the lower end side from the center of screen 20 is unlikely to become unnecessary transmitted images. Therefore, the ratio D/P of a louver structure is set at less than or equal to 2.0. This allows screen 20 to significantly inhibit the transmittance of the image light having the incident angle greater than or equal to the incident angle in the center.

Note that in the present exemplary embodiment, base material 21 and base material 23 are joined by transparent adhesive layer 25. This allows reduction in the interfaces between each base material and the air. Therefore, a decrease in transmittance of background light by a reflection loss in the interface between each base material and the air can be inhibited. Furthermore, light absorption materials 24 can inhibit generation of double images by emission side surface reflection of the transmitted image. However, even if base material 21 and base material 23 are disposed via an air layer without using transparent adhesive layer 25, generation of unnecessary images by the rectilinearly transmitted light is inhibited similarly.

Figure 3:
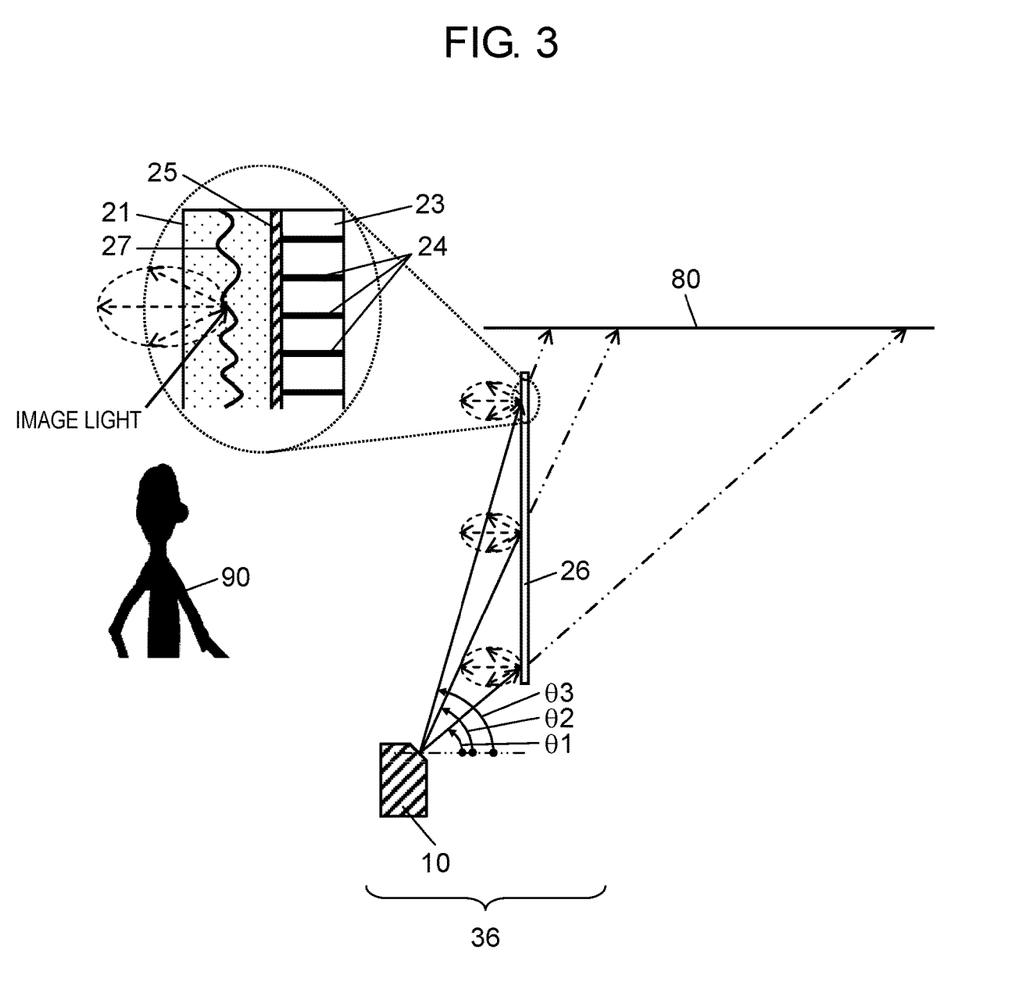
FIG. 3 is a schematic diagram of another image display system according to the first exemplary embodiment.

Note that in the present exemplary embodiment, screen 20 includes diffusion microparticles 22 disposed within base material 21, but the present disclosure is not limited to this case. FIG. 3 shows image display system 36 of a modification. Image display system 36 includes screen 26 instead of screen 20. Screen 26 includes mirror layer 27 (another example of diffusion member) disposed within base material 21, mirror layer 27 having a fine uneven shape. Mirror layer 27 is, for example, a half mirror that reflects about 10% of incident light and transmits remaining about 90% of the incident light. Mirror layer 27 is formed to have the fine uneven shape. Therefore, image light undergoes diffused reflection by screen 26 macroscopically, and can be observed as an image.

Figure 4:
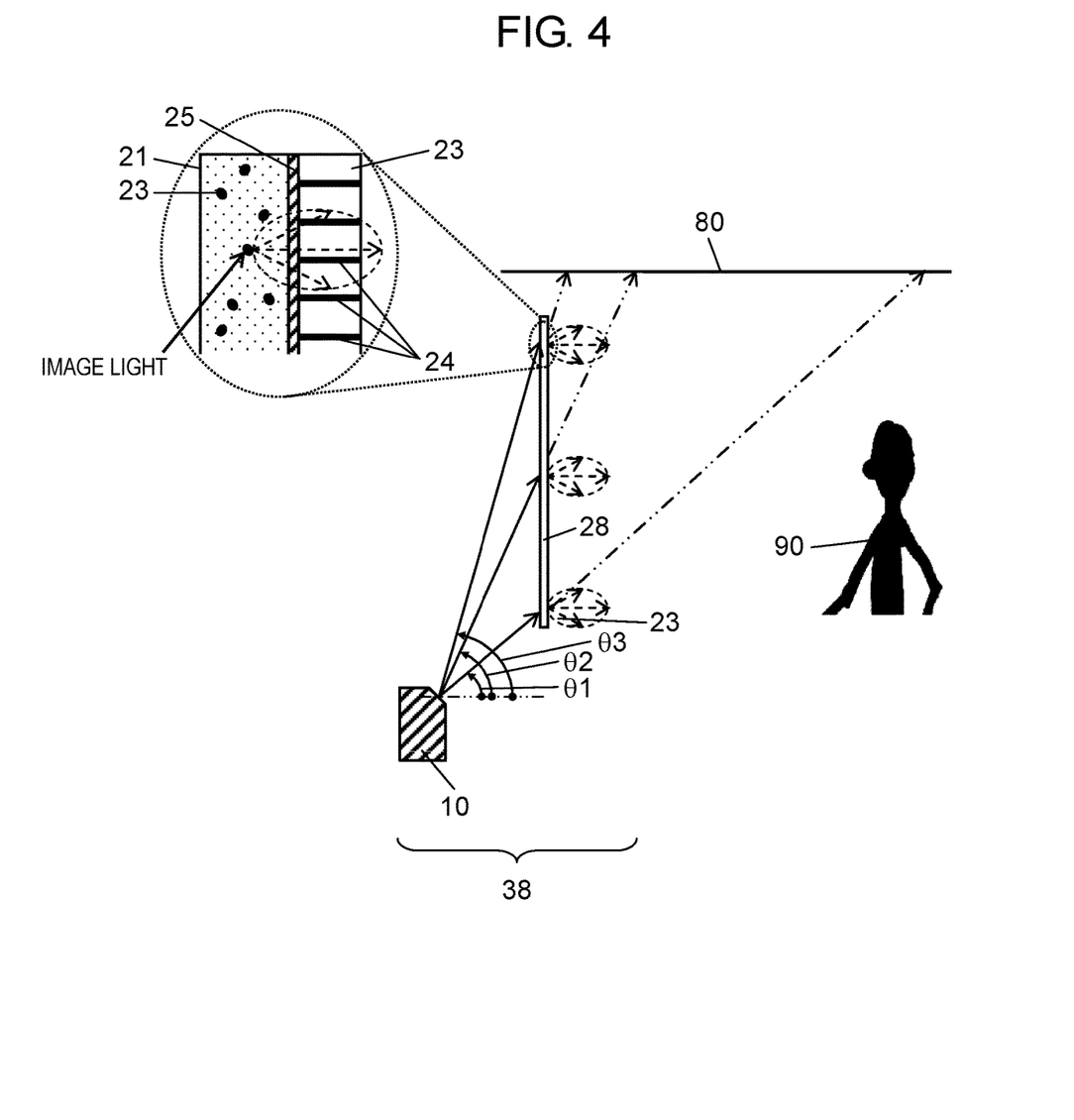
FIG. 4 is a schematic diagram of still another image display system according to the first exemplary embodiment.

Note that in the present exemplary embodiment, image display system 30 includes screen 20 of a diffused reflection type, but the present disclosure is not limited to this case. As shown in FIG. 4, image display system 38 of a modification may include screen 28 of a diffused transmission type. In this case, screen 28 causes image light projected from projector 10 to undergo diffused transmission to display an image. Since screen 28 transmits background light, the image light is also transmitted through screen 28 rectilinearly. Therefore, as in image display system 30 of a reflection type, part of the image light is transmitted through screen 28 rectilinearly, generating unnecessary transmitted images. Therefore, as shown in FIG. 4, by disposing base material 23 and a plurality of light absorption materials 24 on an opposite side of base material 21 from projector 10, generation of unnecessary images on ceiling 80 can be inhibited.

INDUSTRIAL APPLICABILITY

A screen according to the present disclosure can inhibit generation of unnecessary images by image light transmitted through the screen, while implementing transmission of background light. Therefore, the screen according to the present disclosure is useful as a screen that causes image light projected from a projector to undergo diffused reflection or diffused transmission to display an image, the screen also transmitting background light.

REFERENCE MARKS IN THE DRAWINGS

10: projector
20, 26, 28: screen (transparent screen)
21: base material (first base material)
23: base material (second base material)
22: diffusion microparticles (diffusion member)
24: light absorption materials
25: transparent adhesive layer (transparent material)
27: mirror layer (diffusion member)
30, 36, 38: image display system
80: ceiling
90: observer
X: normal direction
Y: arrangement direction

The invention claimed is:

1. A transparent screen for diffusing image light projected from a projector being disposed to make an incidence angle of an image light to a center of the transparent screen between 40 degrees and 50 degrees inclusive and displaying an image by transmitting part of incident light rectilinearly and diffusing another part of the incident light, the transparent screen comprising:

a first base material that is transparent;
a diffusion member disposed within the first base material, the diffusion member diffusing the image light;
a second base material that is transparent and disposed on an opposite side of the first base material from the projector; and
a plurality of light absorption materials disposed within the second base material and arranged parallel to each other along an arrangement direction parallel to a principal plane of the second base material, wherein plurality of light absorption materials extends along a normal direction to the principal plane, and a ratio of a length of the plurality of light absorption materials in the normal direction to an arrangement interval of the plurality of light absorption materials is between 1.2 and 2.0 inclusive.

2. The transparent screen according to claim 1, wherein the diffusion member includes microparticles.

3. The transparent screen according to claim 1, wherein the diffusion member includes a mirror layer reflecting and transmitting the image light.

4. The transparent screen according to claim 2, wherein when viewed from the normal direction, a ratio of an area of the plurality of light absorption materials to an area of the second base material is between 1% and 10% inclusive.

5. The transparent screen according to claim 1, wherein the first base material and the second base material are joined with a transparent material.

6. An image display system comprising:

a projector configured to project image light; and a transparent screen configured to diffuse the image light and display an image by transmitting part of incident light rectilinearly and diffusing another part of the incident light, the transparent screen including:

a first base material that is transparent;

a diffusion member disposed within the first base material, the diffusion member diffusing the image light; and a second base material that is transparent and disposed on an opposite side of the first base material from the projector; and a plurality of light absorption materials disposed within the second base material and arranged parallel to each other along an arrangement direction parallel to a principal plane of the second base material, wherein the projector is disposed to make an incidence angle of the image light to a center of the transparent screen between 40 degrees and 50 degrees inclusive, the plurality of light absorption materials extends along a normal direction to the principal plane, and a ratio of a length of the plurality of light absorption materials in the normal direction to an arrangement interval of the plurality of light absorption materials is between 1.2 and 2.0 inclusive.

7. The image display system according to claim 6, wherein the projector is disposed to make a maximum incidence angle of the image light to the transparent screen between 60 degrees and 75 degrees inclusive.

8. The image display system according to claim 6, wherein the diffusion member includes microparticles.

9. The transparent screen according to claim 6, wherein the diffusion member includes mirror layer reflecting and transmitting the image light.

* * * * *